United States Patent

Burg et al.

[15] 3,639,192
[45] Feb. 1, 1972

[54] BONDING WITH THERMOPLASTIC POLYACETAL ADHESIVES

[72] Inventors: Karlheinz Burg, Hofheim, Taunus; Harald Cherdron, Wiesbaden; Heinz Lehmann, Kriftel, Taunus; Eleonore Lutz, Frankfurt, Main, all of Germany

[73] Assignee: Farbwerke Hoechst Aktiengesellschaft vormals Meister Lucius & Bruning, Frankfurt, Main, Germany

[22] Filed: Feb. 25, 1969

[21] Appl. No.: 802,200

[30] Foreign Application Priority Data

Mar. 5, 1968 Germany .......................P 17 19 125.2

[52] U.S. Cl............................156/327, 117/155 L, 156/283, 156/309, 156/330, 161/182, 161/184, 161/267, 161/270, 260/67 FP
[51] Int. Cl. .......................................................C09j 3/14
[58] Field of Search ...............260/67 FP; 156/327, 330, 283, 156/309

[56] References Cited

UNITED STATES PATENTS

| | | | |
|---|---|---|---|
| 3,518,231 | 6/1970 | Hafner et al. | 260/67 FP |
| 2,775,570 | 12/1956 | Barkdoll et al. | 260/33.4 |
| 3,227,670 | 1/1966 | Regan | 260/29.2 |
| 3,275,604 | 9/1966 | Kray et al. | 260/67 |
| 3,385,827 | 5/1968 | Fischer et al. | 260/67 |
| 3,436,299 | 4/1969 | Halek et al. | 161/160 |
| 3,453,238 | 7/1969 | Fischer et al. | 260/67 |
| 3,454,528 | 7/1969 | Hafner et al. | 260/67 |
| 3,457,229 | 7/1969 | Fischer et al. | 260/67 |

OTHER PUBLICATIONS

Zimmerman et al., Handbook of Material Trade Names (1953) Industrial Research Services, Inc. Dover, N.H. pg. 231

*Primary Examiner*—Carl D. Quarforth
*Assistant Examiner*—E. A. Miller
*Attorney*—Curtis, Morris & Safford

[57] ABSTRACT

Polyacetals, consisting of homo- or copolymers of formaldehyde or trioxane and having a good flowability as well as a resistance to alkali and solvents, are used as thermoplastic adhesives for textiles, paper and wood.

7 Claims, No Drawings

BONDING WITH THERMOPLASTIC POLYACETAL ADHESIVES

The present invention relates to thermoplastic adhesives on the basis of polyacetals and a process for their manufacture.

Thermoplastic adhesives, which at room temperature, are not tacky, but tough and solid and are melted under the action of heat and applied to the surfaces to be bonded with the aid of suitable devices, have already been proposed. After joining the surfaces, the adhesives cools and a solid bond of the surfaces is obtained. Because of the rapid cooling, thermoplastic adhesives permit to work rapidly.

For bonding paper, textiles and leather, polyesters have already been proposed. By varying the dicarboxylic acids or glycols of these polycondensates it is possible to prepare the thermoplastic adhesive most suitable for a given surface. Good results have also been obtained with copolyesters, for which several acids have been used for the polycondensation.

Copolymers of ethylene and vinyl acetate have also been used as thermoplastic adhesives for various fields of application. By varying the ratio of comonomers, a thermoplastic adhesive can be prepared answering to a determined bonding problem.

However, the use of the said polymers has the disadvantage, that the ester groups in the main or lateral chain of the macromolecule are unstable against alkali. Particularly in the field of textiles, the bonds obtained with these polymers are not resistant to washing with alkali.

It is also known from British Pat. No. 1,068,980 that copolymers of trioxane, 0 to 10 percent by weight of cyclic ethers and 0.5 to 20 percent by weight of cyclic ethers containing fluorine have a good adhesion to metals.

Now we have found thermoplastic adhesives for textiles, paper and wood, consisting of a homopolymer of formaldehyde or trioxane having etherified or esterified terminal groups or of a copolymer of formaldehyde or trioxane with one or more cyclic ethers, cyclic and/or linear acetals and/or alkyl-glycidyl-formals, polyglycoldiglycidyl ethers or bis(alkane-triol)-triformals.

The above homo- and copolymers of formaldehyde or trioxane are polyacetals which, in addition to having a good flowability, are particularly distinguished by their resistance to alkali and solvents. On one hand, the good flowability involves a rapid and uniform distribution of the adhesive in the melting process, on the other hand the good resistance to alkali and to the solvents is particularly advantageous when using the polyacetals for bonding textiles. The thermoplastic adhesive is affected neither by drycleaning nor by washing with an alkaline medium. The polyacetals may be used for the thermoplastic bonding of wood and paper as well.

By polyacetals there are to be understood, in accordance with the invention, homopolymers of formaldehyde or trioxane, the terminal OH-groups of which have been stabilized against degradation by esterification or etherification, as well as copolymers or terpolymers thereof.

As comonomers for trioxane, cyclic ethers and cyclic acetals are particularly suitable. These compounds correspond to the general formula (I)

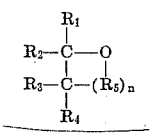

in which $R_1$, $R_2$, $R_3$ and $R_4$ are identical or different and stand for hydrogen atoms or alkyl radicals or halogen-substituted alkyl radicals and $R_5$ stands for a methylene or oxymethylene group, a methylene or oxymethylene group which may be substituted by alkyl or halo-alkyl radicals, $n$ being a whole number from 1 to 3, or $R_5$ stands for the radical

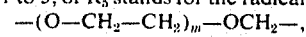

$n$ being 1 and $m$ being a whole number from 1 to 3. The above alkyl radicals contain from one to five, preferably from one to three carbon atoms and may be substituted by from zero to three halogen atoms, preferably chlorine atoms. There are preferably used cyclic ethers having from three to five ring members or cyclic acetals, particularly cyclic formals, having from five to nine ring members.

As cyclic ethers, there are particularly suitable ethylene oxide, propylene oxide and epichlorhydrin, as cyclic acetals, there are preferably used glycol- formal (1.3-dioxolane), diglycol formal and 4-chloromethyl-dioxolane.

Finally, linear formals of long-chain α, ω-diols, for example 1,4-butane-diol-formal or 1,6-hexane-diol-formal are also suitable.

As tercomponents such compounds are especially used which modify the flowability of the polyacetal obtained, for example alkyl-glycidyl-formals, polyglycol-diglycidyl ethers and bis(alkane-triol)-triformals of the following formula (II)

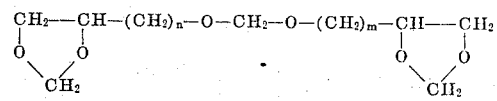

in which $n$ and $m$ each is a whole number from 3 to 9, preferably 3 and 4, that is, compounds having a linear and two cyclic formal groups. As bis(alkane-triol)-triformal, the triformal of 1,2,5-pentanetriol and of 1,2,6-hexanetriol is preferably used.

The proportion of cocomponent of the copolymers of trioxane is within the range of from 1 to 60 percent, preferably from 1 to 30 percent, calculated on the total weight of the components. By varying the proportion of cocomponent, it is possible to adjust the melting point and other properties important for the process of thermoplastic bonding, for example the pressure dependence of the melt viscosity and the affinity to the materials to be bonded, in a manner such that the adhesive most suitable for bonding a determined surface is obtained.

The proportion of tercomponent of polymers of trioxane is within the range of from 0.05 to 5 percent preferably 0.05 to 1 percent, calculated on the total weight of the components. By varying the content of the tercomponent, a product can be obtained for bonding textiles, paper and wood, which has the flow properties desired in a given case.

The molecular weight of the polyacetals used in accordance with the invention is within large limits. Excellent results are, for example, obtained using polyacetals with molecular weights within the range of from 50,000 to 200,000, preferably 50,000 to 100,000. Good results are also obtained with those within the range of from 5,000 to 50,000, particularly in the case of copolymers having a comonomer content of more than 20 percent by weight.

For bonding textiles, from 10 to 150 grams, preferably 10 to 80 grams, of polyacetal per square meter tissue are used. The bonding proper is then carried out by heating.

The ironing temperature is advantageously by 20° to 50° C. higher than the melting temperature of the polyacetal used, that is within the range of from 40° to 250° C. In order to obtain an optimum wetting of the tissue, the surface to be bonded must be exposed to the ironing temperature for 10 to 120, preferably 30 to 90 seconds.

The polyacetal may also be used as thermoplastic adhesive in the form of a thin, flexible, self-supporting rod or rope. Under the above processing conditions, a continuous thermoplastic bonding of paper, wood and textiles is then carried out.

When using polyacetals which are substantially insoluble at room temperature the bonding of paper is carried out in the same manner as described for textiles. By increasing the proportion of cocomponent in the polyacetal, it can be achieved that the product is soluble at room temperature in easily volatile solvents, for example chlorinated hydrocarbons. The solution is then, advantageously, applied to the paper surfaces to be bonded. After evaporation of the solvent, a polyacetal film which does no bond ("block") at room temperature is left on the paper. Bonding is obtained by heating the paper surfaces thus treated to ironing temperatures which are by 20° to 50° C. higher than the melting temperature of the polyacetal. By bonding there is to be understood, in this case, the production of a joint between two pieces of paper which can only be separated with tearing or splitting of the paper. Also in this case, the ironing time is within the range of from 10 to 120, preferably 30 to 90 seconds. The thickness of the polyacetal film on the paper surface is from 20 to 200, preferably from 50 to 150 microns.

By paper there are herein meant the commercial types of paper, for example unbleached sodium kraft paper, bleached sodium kraft paper, writing paper and cardboard.

For the thermoplastic bonding of wood, for example, a copolymer of 60 percent by weight of trioxane and of 40 percent by weight of dioxane is heated to 180° C. in the melt apparatus of an edging profile. The application of the thermoplastic adhesive to wood is carried out with the aid of a roller. The edging profile may be of plywood or of laminated material. The work article treated on the edging profile can be worked further instantly. The thermoplastic adhesive can be maintained at 180° C. during a workday, without decomposition.

The following examples serve to illustrate the invention, but are not intended to limit it.

EXAMPLE 1

One gram of a copolymer of 98 percent by weight trioxane and 2 percent by weight ethylene oxide having a reduced specific viscosity $\eta$ red = 0.78, measured at 140° C. in butyrolactone in a concentration of $c$=0.5 gram per 100 milliliters, was uniformly distributed on 140 square centimeters of linen. At an ironing temperature of 220° C., a piece of linen of equal size was pressed for 60 seconds onto the surface powdered with the polyacetal. The bonding so obtained remained unchanged in a normal washing process (pH-value = 7 to 10; temperature = 100° C.) as well as a drycleaning process (solvent: trichlorethylene; temperature: 87° C.).

EXAMPLE 2

The process was carried out in a manner analogous to example 1, using, however, as polyacetal a copolymer of 70 percent by weight of trioxane and 30 percent by weight of dioxolane ($\eta$ red = 0.88). At an ironing temperature of 170° C. and with an ironing time of 60 seconds the same bond was obtained as in example 1.

EXAMPLE 3

The process was carried out as described in example 1, using, however, as polyacetal a terpolymer of 97.5 percent by weight of trioxane, 2 percent by weight of ethylene oxide and 0.5 percent by weight of hexanetriol-triformal, ($\eta$ red = 0.67). At an ironing temperature of 220° C. and with an ironing time of 60 seconds the same bond was obtained as in example 1.

EXAMPLE 4

Five hundred milligrams of a polyformaldehyde with acetalized terminal groups ($\eta$ red = 0.82) were uniformly distributed on a surface of 100 square centimeters of unbleached sodium kraft paper. At an ironing temperature of 220° C. and with an ironing time of 60 seconds a piece of unbleached sodium kraft paper of equal size was pressed onto the powdered paper surface. When bonding the screen side of the paper in this manner a joint of the two paper pieces was obtained which could only be broken by tearing or splitting the paper.

EXAMPLE 5

The process was carried out in a manner analogous to example 4, using, however, as polyacetal, a terpolymer of 97.95 percent by weight of trioxane, 2 percent by weight of ethylene oxide and 0.05 percent by weight of 1,4-butanediol-diglycidyl ether ($\eta$ red = 0.78). The same bond was obtained as in example 4.

EXAMPLE 6

The process was carried out in a manner analogous to example 4, using, however, a terpolymer of 60 percent by weight of trioxane, 35 percent by weight of 1.3-dioxolane and 5 percent by weight of 1.4-butane-diol-formal ($\eta$ red = 0.71). At an ironing temperature of 150° C. and with an ironing time of 60 seconds the same bond was obtained as in example 4.

EXAMPLE 7

To the screen side of an unbleached sodium kraft paper, a solution of 10 percent by weight strength of a copolymer of 50 percent by weight of trioxane and 50 percent by weight of 1,3-dioxolane ($\eta$ red = 0.89) in methylene chloride was applied in a manner such that, after evaporation of the solvent, a film from 50 to 150 microns thick was obtained. When ironing the paper so treated at 150° C. for 60 seconds a bond was obtained which could only be broken by tearing or splitting the paper.

A bond of the same quality was obtained when using a welding electrode holder.

What we claim is:

1. In a process for bonding linen textiles, paper and wood with a thermoplastic adhesive the improvement which comprises using as an adhesive at a temperature above its melting point a normally solid acetal polymer selected from (a) homopolymers of formaldehyde or trioxane having stabilized terminal groups, (b) copolymers of formaldehyde or trioxane with 1 to 60 percent by weight, based on the total weight of monomers, of a cyclic ether of the formula

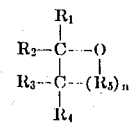

in which $R_1$, $R_2$, $R_3$ and $R_4$ may be the same or different and represent hydrogen, or alkyl or haloalkyl radicals, $R_5$ represents a methylene or oxymethylene group which may be substituted by alkyl or haloalkyl radicals, and $n$ is 1 to 3, or $R_5$ represents the radical

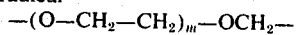

$n$ being 1 and $m$ being 1 to 3 and (c) a terpolymer of formaldehyde or trioxane with 1 to 60 percent by weight of a cyclic ether as defined in (b) and 0.5 to 5 percent by weight of an alkyl glycidyl formal, polyglycol diglycidyl ether or bis(alkanetriol)triformal, and cooling the acetal polymer to solidify it and thereby effect the desired bonding of the linen textile, paper or wood.

2. A process according to claim 1 wherein the thermoplastic adhesive is a copolymer of trioxane and ethylene oxide.

3. A process according to claim 1 wherein the thermoplastic adhesive is a copolymer of trioxane and dioxolane.

4. A process according to claim 1 wherein the thermoplastic adhesive is a copolymer of trioxane, ethylene oxide and hexanetriol-triformal.

5. A process according to claim 1 wherein the thermoplastic adhesive is a polyformaldehyde with acetalized terminal groups.

6. A process according to claim 1 wherein the thermoplastic adhesive is a copolymer of trioxane, ethylene oxide and 1,4-butanediol-diglycidyl ether.

7. A process according to claim 1 wherein the thermoplastic adhesive is a copolymer of trioxane, 1,3-dioxolane and 1,4-butane-diol-formal.

* * * * *